(12) United States Patent
Ching et al.

(10) Patent No.: US 10,966,420 B2
(45) Date of Patent: Apr. 6, 2021

(54) INSECT TRAP

(71) Applicant: Microsoft Technology Licensing, LLC, Redmond, WA (US)

(72) Inventors: Alexander Ching, Bellevue, WA (US); Ethan Jackson, Redmond, WA (US); Michael J. Sinclair, Kirkland, WA (US); Patrick Therien, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 810 days.

(21) Appl. No.: 15/178,354

(22) Filed: Jun. 9, 2016

(65) Prior Publication Data

US 2017/0354135 A1    Dec. 14, 2017

(51) Int. Cl.
*A01M 1/10*      (2006.01)

(52) U.S. Cl.
CPC .............. *A01M 1/106* (2013.01); *A01M 1/10* (2013.01); *A01M 2200/012* (2013.01)

(58) Field of Classification Search
CPC .......... A01M 1/00; A01M 1/02; A01M 1/023; A01M 1/026; A01M 1/10; A01M 1/106; A01M 1/12; A01M 23/00; A01M 23/02; A01M 23/08; A01M 23/14; A01M 23/16; A01M 23/18; A01M 23/20
USPC ..... 43/107, 110, 111, 58, 60, 61, 64, 65, 67, 43/121
See application file for complete search history.

(56) References Cited

U.S. PATENT DOCUMENTS

| | | | | |
|---|---|---|---|---|
| 1,093,880 A | * | 4/1914 | Palmowski | A01M 23/18 43/61 |
| 1,218,406 A | * | 3/1917 | Jackson | A01M 23/30 43/81 |
| 1,243,008 A | * | 10/1917 | Taylor | A01M 23/18 43/61 |
| 1,532,057 A | * | 3/1925 | Lychyj | A01M 23/00 43/76 |
| 1,792,774 A | * | 2/1931 | Snider | A01M 23/245 43/81 |
| 1,807,171 A | * | 5/1931 | Pisani | A01M 23/00 43/86 |
| 2,113,908 A | * | 4/1938 | Thompson | A01M 23/00 43/120 |

(Continued)

FOREIGN PATENT DOCUMENTS

| | | | | |
|---|---|---|---|---|
| CA | 3037504 A1 | * | 3/2018 | ............. A01M 1/02 |
| CN | 201492097 | | 6/2010 | |

(Continued)

OTHER PUBLICATIONS

Ifantidis, et al., "A new trap for flying intruders in the bee colony as an integral part of the modern beehive", in Journal of Honeybee Science, vol. 26, Issue 1, Dec. 28, 2005, 6 pages.

(Continued)

*Primary Examiner* — Darren W Ark

(57) ABSTRACT

In some implementations, an insect trap includes a plurality of individual cells, with each of the cells being configured to trap very few, and in some instances a single flying insect. Each cell defines a cavity and may be provided with an independently operable door to selectively close the cavity. One or more sensors may sense the presence of an insect to be trapped.

8 Claims, 4 Drawing Sheets

(56) References Cited

U.S. PATENT DOCUMENTS

| | | | | |
|---|---|---|---|---|
| 2,513,837 A * | 7/1950 | Black, Jr. | A01M 23/20 | 43/65 |
| 2,534,358 A * | 12/1950 | Lehn | A01M 23/18 | 43/85 |
| 2,574,780 A * | 11/1951 | Giacoletto | A01M 23/20 | 43/61 |
| 2,682,726 A * | 7/1954 | Gustinan | A01M 23/02 | 43/61 |
| 3,624,951 A * | 12/1971 | Gilbaugh | A01M 23/18 | 43/61 |
| 3,796,001 A | 3/1974 | Jackson | | |
| 3,802,116 A * | 4/1974 | Meguro | A01M 1/02 | 43/121 |
| 3,913,259 A * | 10/1975 | Nishimura | A01M 1/02 | 43/114 |
| 3,968,590 A * | 7/1976 | Kitterman | A01M 1/02 | 43/114 |
| 4,217,722 A * | 8/1980 | McMullen | A01M 1/14 | 43/114 |
| 4,275,523 A * | 6/1981 | Baima | A01M 1/02 | 43/112 |
| 4,462,182 A * | 7/1984 | French | A01M 23/34 | 43/131 |
| 4,471,563 A * | 9/1984 | Lindgren | A01M 1/106 | 43/122 |
| 4,505,065 A * | 3/1985 | Niemeyer | A01M 1/106 | 43/107 |
| 4,676,022 A * | 6/1987 | Wraight | A01M 3/022 | 43/121 |
| 4,709,503 A * | 12/1987 | McQueen | A01M 1/14 | 43/114 |
| 4,709,504 A * | 12/1987 | Andric | A01M 1/14 | 43/114 |
| 4,815,231 A * | 3/1989 | McQueen | A01M 1/14 | 43/114 |
| 4,819,371 A * | 4/1989 | Cohen | A01M 1/2005 | 43/114 |
| 5,040,326 A * | 8/1991 | Van Dijnsen | A01M 23/02 | 43/139 |
| 5,123,201 A * | 6/1992 | Reiter | A01M 1/026 | 43/107 |
| 5,148,625 A * | 9/1992 | Saleman | A01M 23/18 | 43/107 |
| 5,203,103 A * | 4/1993 | Hawley | A01K 85/00 | 43/17.1 |
| 5,272,179 A * | 12/1993 | Butler | A01M 1/02 | 514/729 |
| 5,382,422 A | 1/1995 | Dieguez et al. | | |
| 5,396,729 A * | 3/1995 | Vejvoda | A01M 1/02 | 43/114 |
| 5,454,186 A * | 10/1995 | Gang | A01M 1/14 | 43/114 |
| 5,560,146 A * | 10/1996 | Garro | A01M 1/02 | 43/111 |
| 5,572,825 A * | 11/1996 | Gehret | A01M 1/02 | 229/120.11 |
| 5,926,997 A * | 7/1999 | Wilcox | A01M 1/026 | 43/121 |
| 6,108,965 A | 8/2000 | Burrows et al. | | |
| 6,202,339 B1 * | 3/2001 | Knuppel | A01M 1/026 | 43/114 |
| 6,202,340 B1 * | 3/2001 | Nieves | A01M 23/02 | 43/61 |
| 6,272,790 B1 * | 8/2001 | Paganessi | A01M 1/023 | 43/107 |
| 6,442,889 B1 * | 9/2002 | Lee | A01M 1/14 | 43/114 |
| 6,467,215 B1 * | 10/2002 | Nelson | A01M 1/023 | 43/107 |
| 6,568,125 B2 * | 5/2003 | Kleinhenz | A01M 1/023 | 43/107 |
| 6,718,687 B2 | 4/2004 | Robison | | |
| 6,718,688 B2 * | 4/2004 | Garretson | A01M 1/026 | 43/111 |
| 6,779,296 B1 | 8/2004 | Mosher, II | | |
| 6,786,001 B1 * | 9/2004 | Piper | A01M 1/106 | 43/113 |
| 6,807,767 B1 * | 10/2004 | Schade | A01M 31/002 | 43/77 |
| 6,865,843 B1 * | 3/2005 | Jordan, Sr. | A01M 23/12 | 43/139 |
| 6,925,747 B1 * | 8/2005 | Swanson | A01K 85/16 | 43/17.1 |
| 6,966,142 B1 | 11/2005 | Hogsette et al. | | |
| 7,051,472 B1 * | 5/2006 | Kelly | A01M 1/023 | 43/58 |
| 7,167,099 B2 * | 1/2007 | Kadwell | G08B 17/107 | 250/573 |
| 7,441,368 B1 * | 10/2008 | Rieger | A01M 1/026 | 43/139 |
| 7,656,300 B2 * | 2/2010 | Ronnau | A01M 1/026 | 340/506 |
| 7,930,853 B2 * | 4/2011 | Pomerantz | A01M 31/002 | 43/60 |
| 8,693,778 B1 * | 4/2014 | Landwehr | A01M 1/026 | 382/165 |
| 8,782,946 B2 * | 7/2014 | Bucher | A01M 23/18 | 43/61 |
| 8,943,742 B2 * | 2/2015 | Aiayedh | A01M 1/106 | 43/107 |
| 9,003,691 B2 * | 4/2015 | Arlichson | A01M 23/18 | 43/61 |
| 9,807,346 B2 * | 10/2017 | Afanasyev | A01M 1/026 | |
| 9,915,732 B2 * | 3/2018 | Weber-Grabau | A01M 1/026 | |
| 9,946,922 B2 * | 4/2018 | Hyde | G06K 9/00362 | |
| 9,999,212 B2 * | 6/2018 | Janet | A01M 1/026 | |
| 10,178,857 B2 * | 1/2019 | Massaro | A01K 29/005 | |
| 10,271,533 B2 * | 4/2019 | Maxik | A01M 1/023 | |
| 10,357,027 B2 * | 7/2019 | Othon | A01M 23/20 | |
| 10,796,161 B2 * | 10/2020 | Bisberg | G06K 9/38 | |
| 2003/0152603 A1 * | 8/2003 | Johnson | A01M 1/023 | 424/405 |
| 2004/0093190 A1 * | 5/2004 | Beroza | A01M 1/026 | 702/189 |
| 2006/0179708 A1 * | 8/2006 | Garland | A01M 1/023 | 43/107 |
| 2006/0265941 A1 * | 11/2006 | Newton | A01M 1/026 | 43/58 |
| 2007/0277425 A1 * | 12/2007 | Beck | A01K 69/06 | 43/65 |
| 2009/0223116 A1 * | 9/2009 | Meghji | A01M 1/026 | 43/118 |
| 2010/0286803 A1 * | 11/2010 | Tillotson | A01M 1/026 | 700/94 |
| 2012/0110892 A1 | 5/2012 | Lloyd et al. | | |
| 2013/0162443 A1 * | 6/2013 | Oppenheimer | H04Q 9/00 | 340/870.03 |
| 2014/0169138 A1 * | 6/2014 | Lee | A01M 29/18 | 367/139 |
| 2014/0250767 A1 * | 9/2014 | Heugle | A01M 1/026 | 43/129 |
| 2014/0283435 A1 * | 9/2014 | Galeb | A01M 23/005 | 43/107 |
| 2014/0360092 A1 * | 12/2014 | Cook, Jr. | A01M 21/02 | 43/124 |
| 2015/0085100 A1 * | 3/2015 | Raschella | A01M 31/002 | 348/82 |
| 2017/0238522 A1 * | 8/2017 | Wakarchuk | A01M 1/106 | |
| 2017/0273291 A1 * | 9/2017 | Yoo | A01M 1/06 | |
| 2018/0271081 A1 * | 9/2018 | Ko | A01M 1/103 | |
| 2018/0325092 A1 * | 11/2018 | Round | A01M 23/12 | |
| 2019/0000059 A1 * | 1/2019 | Marka | A01M 31/002 | |
| 2019/0008136 A1 * | 1/2019 | Marka | F21V 21/15 | |

(56) References Cited

U.S. PATENT DOCUMENTS

| | | | |
|---|---|---|---|
| 2019/0239498 A1* | 8/2019 | Moore | A01M 1/026 |
| 2020/0245604 A1* | 8/2020 | Cherukumalli | A01M 1/106 |

FOREIGN PATENT DOCUMENTS

| | | | | |
|---|---|---|---|---|
| CN | 202476316 | | 10/2010 | |
| EP | 3092895 A1 * | | 11/2016 | A01M 1/04 |
| FR | 2215897 A1 * | | 8/1974 | A01M 1/02 |
| KR | 100753435 B1 * | | 8/2007 | |
| KR | 101423262 B1 * | | 8/2014 | |
| KR | 101476256 B1 * | | 12/2014 | |
| WO | WO-2009111160 A1 * | | 9/2009 | A01M 1/026 |
| WO | WO-2012026703 A2 * | | 3/2012 | A01M 1/103 |
| WO | WO-2012175259 A1 * | | 12/2012 | A01M 1/026 |
| WO | WO-2014024052 A1 * | | 2/2014 | A01M 23/38 |
| WO | WO-2016088458 A1 * | | 6/2016 | A01M 1/2011 |
| WO | WO-2016088890 A1 * | | 6/2016 | A01M 1/10 |
| WO | WO-2016093673 A1 * | | 6/2016 | A01M 1/06 |
| WO | WO-2016130182 A1 * | | 8/2016 | A01M 99/00 |
| WO | WO-2016168347 A1 * | | 10/2016 | A01M 1/023 |
| WO | WO-2017120189 A1 * | | 7/2017 | A01M 31/002 |
| WO | WO-2017154003 A1 * | | 9/2017 | B64C 39/024 |
| WO | WO-2017158216 A1 * | | 9/2017 | A01M 1/026 |
| WO | WO-2017213531 A1 * | | 12/2017 | A01M 1/026 |
| WO | WO-2018101697 A1 * | | 6/2018 | |
| WO | WO-2018136929 A1 * | | 7/2018 | A01M 1/023 |
| WO | WO-2018140679 A1 * | | 8/2018 | A01M 1/00 |
| WO | WO-2019008163 A1 * | | 1/2019 | A01M 1/106 |
| WO | WO-2019036463 A1 * | | 2/2019 | A01M 1/02 |
| WO | WO-2019068945 A1 * | | 4/2019 | |
| WO | WO-2019078786 A1 * | | 4/2019 | A01K 67/033 |
| WO | WO-2019079248 A1 * | | 4/2019 | A01M 1/026 |
| WO | WO-2019088519 A1 * | | 5/2019 | |

OTHER PUBLICATIONS

Kline et al., "Field Evaluation of Heat as an Added Attractant to Traps Baited with Carbon Dioxide and Octenol for Aedes Taeniorhynchus", In Journal of the American Mosquito Control Association, vol. 11, Issue 4, Dec. 1995, pp. 454-456.

The BG-Sentinel: Biogents' mosquito trap for researchers, Retrieved on: May 20, 2016 Available at: http://www.bg-sentinel.com/en/bg-sentinel.html.

* cited by examiner

INSECT TRAP

BACKGROUND

Researchers have long studied living organisms to learn more about environmental conditions. Recently, scientists have become increasingly interested in studying flying insects, including mosquitoes, to look for early signs of potentially harmful diseases. Through the study of mosquitoes, researchers may be able to identify pathogens or harmful diseases before the ill effects of those pathogens or diseases manifest in humans. Accordingly, it may be possible to earlier identify, treat and/or prevent the spread of diseases.

The science of analyzing mosquitoes and other insects has evolved at impressive speeds, but technology surrounding trapping insects has remained relatively undeveloped. Conventionally, bait, often in the form of a carbon dioxide emitter, is placed in a bag and a fan is positioned to force air into the bag. Many flying insects are attracted by the bait, and upon entering the bag, are unable to escape against the airflow produced by the fan. While this method has some success collecting flying insects, it often collects an array of different insects. Researchers then must sift through a bag of insects looking for specific insects they want to study.

SUMMARY

This application describes traps that may be used to trap flying insects, such as mosquitoes. An insect trap may include a plurality of individual cells, with each of the cells being configured to trap very few, and in some instances a single flying insect. By trapping a single insect, the time previously required to separate a certain type of insect from a collection of many types is greatly reduced, and potentially eliminated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
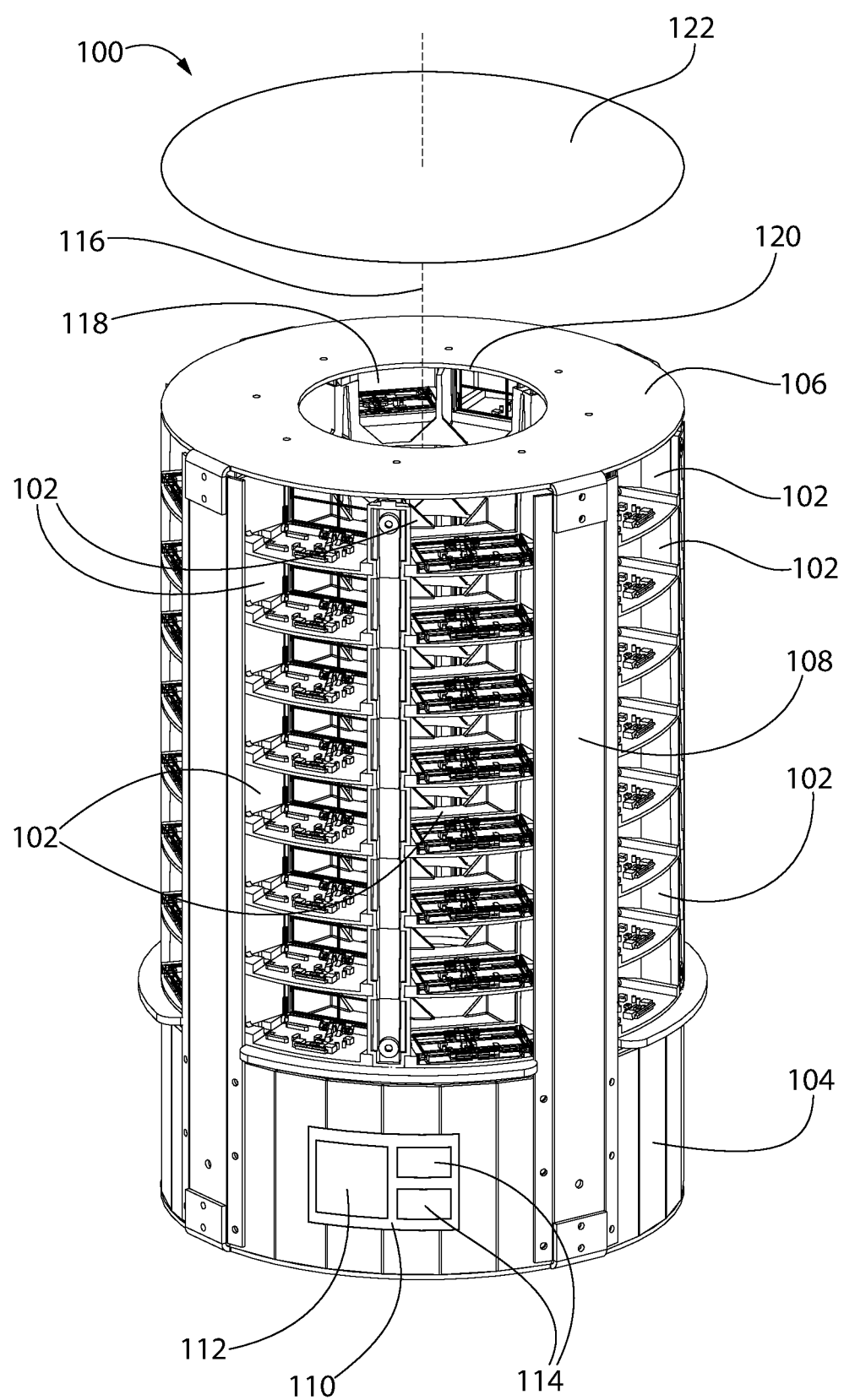
FIG. 1 is a perspective view of an insect trap according to embodiments of this disclosure.

This disclosure describes improved insect traps and techniques for trapping insects. In some implementations of this disclosure, an insect trap may include a plurality of cells. Each cell may define a cavity within which a flying insect is to be trapped, as well as an opening through which the flying insect can enter the cavity. A door may be provided that selectively closes the opening, i.e., to trap the flying insect in the cavity. For example, the door may be biased to a closed position, which traps the insect, but is retained in an open position, in which the opening is unobstructed. In some examples, a latch or similar mechanical mechanism may hold the door open against the bias to the closed position. In other examples, the door may not be biased in either the open or closed position, but may be selectively moveable between those positions.

In some cases, a trap according to embodiments of this disclosure may also include one or more actuators for selectively opening and closing doors associated with each cell. Each actuator may include or cooperate with a latch that holds a respective door in an open position, for example. For example, the door may be biased toward the closed position and the latch may be actuated to disengage with the door, thereby allowing the door to close under a biasing force. In some implementations, the actuator may include a deformable member, such as a memory alloy wire that deforms under applied current. For instance, deformation of the memory alloy wire may move a latch from a retaining position holding the door against a biasing force to a releasing position in which the door is closed by the biasing force. In other embodiments, an actuator, such as an electric or electromagnetic actuator may directly actuate the door from the closed position to the open position and/or from the open position to the closed position. For example, an electromagnetic actuator could be provided that, under an applied charge, closes the door. Accordingly, the door could be retained in the closed position. Moreover, a permanent magnet or mechanical mechanism may be provided to retain the door in the closed position.

In some examples, one or more sensors may also be associated with a cell of an insect trap. For example, motion sensors, contact sensors, acoustic sensors, temperature sensors, or the like, may be positioned to detect a presence of a flying insect in a cavity defined by the cell. In some embodiments, an output from the sensor, e.g., information that a flying insect has entered the cavity, may be processed by the insect trap to trigger a closing of the cell, for example, by closing a door. Moreover, the sensors may detect information about an insect that entered the cavity, e.g., by detecting a size of the insect, a flutter pattern of the wings of the insect, or other elements of a signature unique to the type of insect. With the information about the insect, it may be possible to discriminate between types of flying insects such that, in one non-limiting example, only mosquitoes are trapped, while other flying insects that may enter the cells are not trapped in the cells. For example, the trap may be configured to close a door when a desired insect enters the cell, but retain the cell open when a different, non-desired insect enters.

In one non-limiting example of this disclosure, multiple modules, each containing one or more cells, may be provided. The modules may be configured to mount to, nest with, or otherwise cooperate with each other. For example, the modules may stack to form a column of modules. Multiple columns may then be coupled or otherwise arranged proximate each other, e.g., in an array. In some embodiments, the array may define a central opening, and bait may be placed in the opening. In this non-limiting example, the bait may emit a gaseous attractant, and the gaseous attractant enters each of the cells to attract the insects to the cells.

In some embodiments, a gaseous attractant for baiting insects to the trap may be carbon dioxide emitted by dry ice or a pressure vessel. Odorants may also be used as a gaseous attractant in some examples. When a gaseous attractant is used, a single emitter of the gaseous attractant may be used to provide the gaseous attractant to a number of cells. To allow the gaseous attractant to enter the cells, a portion of each of the cells configured to trap an insect may be vapor permeable. For example, a surface defining a cavity of the cell may include holes or other passageways that allow the gaseous attractant to enter the cell. The cells or passageways may be sized to prevent a trapped insect from escaping, or may be covered to retain an insect in the trap. In other embodiments of this disclosure, other types of bait may also or alternatively be used. For example, some insects are attracted to light, and a light source, such as one or more light emitting diodes (LEDs), may be used to attract insects to the trap. Other examples may use a heat source or an acoustic transmission.

In some examples, as a result of the insect traps described herein, researchers may trap fewer total insects, but the insects they do trap may be more likely to be the type of insect desired to be studied. Also, in some examples, researchers may avoid trapping or otherwise harming desirable insects, such as bees. Moreover, insect traps according to this disclosure may be scalable, e.g., to readily trap more or fewer insects.

For discussion purposes, some example implementations of traps are described in connection with trapping flying insects, such as mosquitoes. However, the implementations herein are not limited to the particular examples provided, and may be extended to other types of insects, and other types of living organisms, as will be apparent to those of skill in the art in light of the disclosure. The specific features and acts are disclosed as example forms of implementing the claims.

FIG. 1 illustrates an example insect trap 100 for trapping flying insects, such as mosquitoes, according to embodiments of the present disclosure. The insect trap 100 generally includes a plurality of cells 102, each configured to trap one or more flying insects. As described in more detail below, each of the cells may be configured to receive a single insect, and in some instances, a single type of insect.

In embodiments of this disclosure, the cells 102 are arranged as an array of cells. For instance, in the embodiment illustrated in FIG. 1, a plurality of cells are stacked to form a column, and a plurality of columns are disposed around a central axis. In embodiments of this disclosure, and as described in more detail below, the cells 102 may be individually controllable, e.g., such that each cell can trap a flying insect independent of other cells.

As also illustrated in FIG. 1, the columns of cells 102 generally extend vertically between a base 104 and a top 106. The base 104 and the top 106 may comprise a portion of a housing or support structure that maintains cells 102 in their preferred configuration. Vertical supports 108 may also be provided to enhance stability of the trap 100 and/or to cover additional components of the trap 100. By way of non-limiting example, electronics, computing devices, and/or other operating features may be disposed in a vertical channel between adjacent cells, and the vertical supports 108 may cover such components. The cells 102 may be fastened to each other and/or to the top 106, the base 104, and/or the vertical support 108. Moreover, the vertical supports 108 may be fixed to the base 104 and/or to the top 106 using conventional fastening mechanisms, including but not limited to, screws, adhesives, and welds.

As also illustrated in FIG. 1, the insect trap 100 may also include a user interface 110. A user may determine information about the trap 100 via the user interface. For example, the user interface 110 may be provided with a display 112 configured to render information about the trap 100. For example, the display may provide information about a number of cells that contain trapped insects, the current ambient conditions surrounding the cells, or the like. The display 112 may also provide information about when insects in various of the cells were trapped and details about their capture. Moreover, the insect trap 100 may include a number of sensors, such as environmental sensors, and information obtained from those sensors may be rendered on the display 112. In some examples, the environmental sensors may include sensors detecting information about the environment surrounding the trap 100. Such sensors may include temperature sensors, barometric pressure sensors, humidity sensors, and the like. The display may be any conventional display, such as an LED or LCD monitor, and the display 112 may have touch input capabilities.

One or more interface buttons 114 may also be provided on the user interface 110. In some embodiments, the buttons 114 may be used to manipulate content rendered on the display 112. For example, a user may interact with the display via the buttons 114 to toggle through sensor readings or information about cells. Moreover, one or more of the buttons 114 may be provided to control operation of the insect trap. For instance, one or more of the buttons 114 may be a power button that supplies power from a power source (not shown) to controls controlling each of the cells 102. Although two buttons are illustrated in FIG. 1, the disclosure is not limited to two buttons. Instead, the user interface 110 may include more or fewer buttons 114. In some embodiments, the buttons 114 may not be provided. For example, as noted above, the display 112 may be a touch display, in which case separate buttons 114 may be superfluous. Moreover, although the term "buttons" is used in this description, the term is understood to embody and encompass any user interface element through which a user may interact with the insect trap 100.

In the embodiment illustrated in FIG. 1, the insect trap 100 is generally cylindrical. More specifically, the cells 102 are arranged in a generally circular array about a central axis 116, and the base 104 and the top 106 are generally cylindrical about that same axis 116. This configuration results in a central opening 118 proximate the axis 116. The top 106 may include a cutout 120 that provides access to the opening 116. Although not illustrated, a surface, e.g., a generally planar horizontal surface, may provide a floor of the opening 118. For instance, a generally planar surface may be incorporated into the base 104, e.g., proximate a top of the base.

In use, the opening 118 may be used to house bait for attracting flying insects to the trap 100. In some embodiments, the bait may include an emitter that emits a gaseous attractant. For example, dry ice may be disposed in the opening 118 to give off carbon dioxide. As will be described in more detail below with reference to FIG. 2, at least a portion of the cells 102 may be gas permeable, such that the carbon dioxide enters each of the cells 102. In this example, a single bait source may provide attractant to many cells 102. This disclosure is not limited to the use of dry ice. For example, a pressure vessel that releases carbon dioxide may alternatively be placed in the opening 118. Gaseous attractant other than carbon dioxide may also be used. For example, a gaseous odorant may be dispersed from within the opening 118 into the cells 102. In still other embodiments, non-gaseous bait may be used. For example, an array of ultraviolet light emitting diodes (LEDs) may be disposed in the opening 118 with the ultraviolet light being visible to flying insects through the cells 102. In other examples, an audio transmitter or a heat source may be used to attract the insects. In still other embodiments, bait may not be provided in the opening 118. For example, bait may be placed in each of the cells individually. In other implementations, bait near the trap may sufficiently attract flying insects for trapping, in which case, bait may not be used in the trap at all. By way of non-limiting example, the trap 100 may be placed near naturally occurring flying insect attractants, including but not limited to, mammals.

The insect trap 100 may further include a cap 122. The cap 122 is securable to the top 106 to close the opening 118. Although the cap 122 is illustrated as a generally planar, circular member, the cap 122 may take other sizes, shapes, and configurations. By way of non-limiting example, the cap may also include additional features. For example, one or more handles (not shown) may be provided on the cap. The handle(s) may promote removal of the cap 122 and/or transport of the trap 100 (when the cap is secured to the top 106). In some embodiments, the insect trap may be configured for transport by a transport device, e.g., a drone, and features on the cap and/or elsewhere on the trap 100 may promote securing the trap 100 to the transport device.

As noted above, the trap 100 generally includes a plurality of cells 102. The cells may be prefabricated. One or more cells 102 may be provided in each module 200 and the modules may be assembled to form the trap 100.

Figure 2:
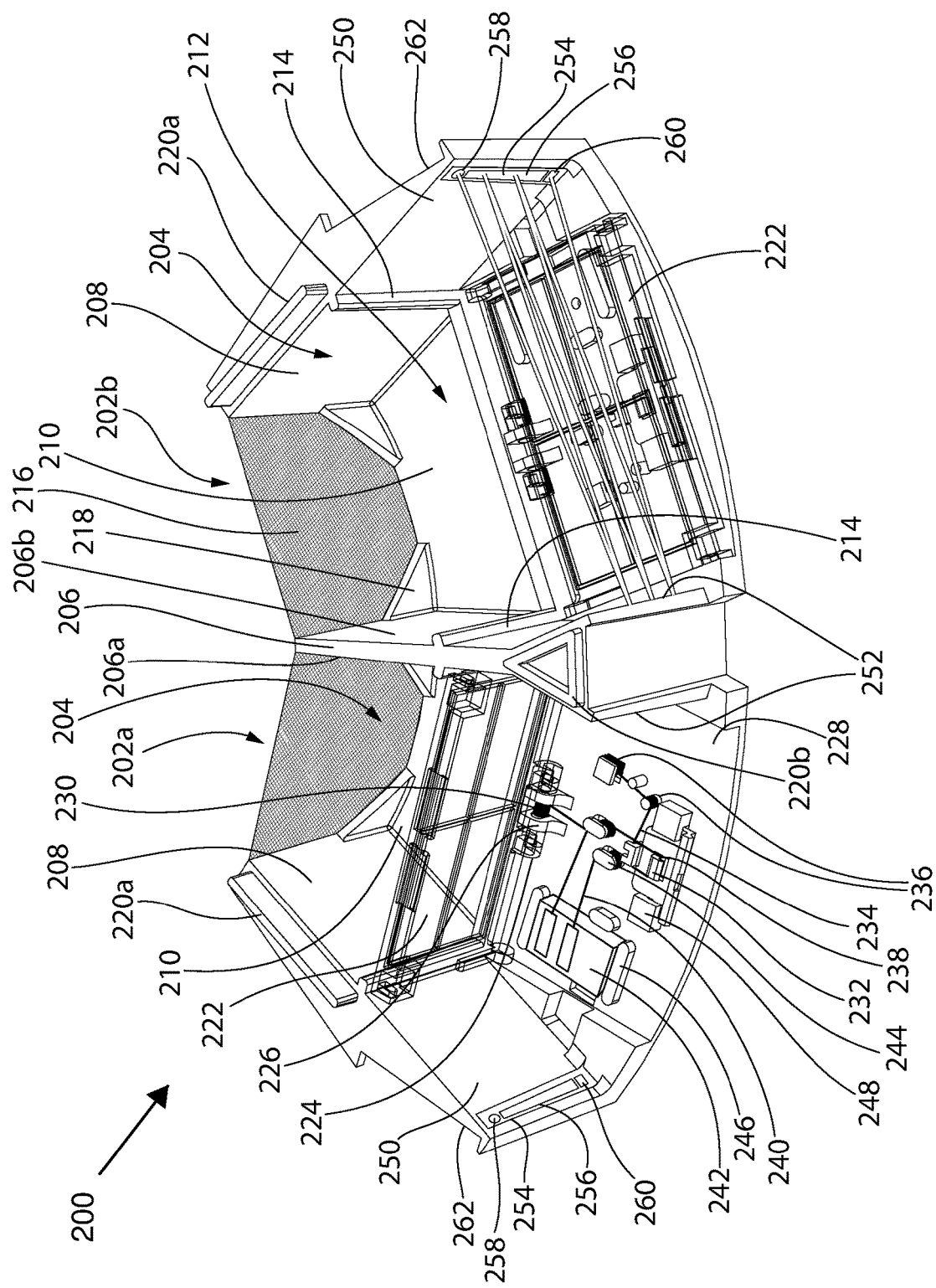
FIG. 2 is a perspective view of an example module that may be used in the insect trap of FIG. 1, according to embodiments of this disclosure.

FIG. 2 is a perspective view of a module 200. Specifically, the module includes a first cell 202a and a second cell 202b (the first and second cells 202a, 202b may be referred to herein collectively as cells 202). As will be appreciated from the following disclosure, the first cell 202a and the second cell 202b are substantially identical in both construction and function. In the embodiment illustrated in FIG. 2, as will be described in more detail below, the first cell 202a is illustrated in a closed configuration and the second cell 202b is illustrated in an open configuration. Although the module 200 is illustrated as including the first cell 202a and the second cell 202b, the module 200 could include only a single cell or more cells.

As noted above, each of the cells 202a, 202b is generally identical. In FIG. 2 and the following description, certain features are illustrated and described in connection with the first cell 202a, and other features are illustrated and described in association with the second cell 202b is used to illustrate and describe additional features. As will be appreciated from the following description, however, features described in connection with the first cell 202a are also included in the second cell 202b and features described in connection with the second cell 202b are also included in the first cell 202a, unless otherwise noted.

Each of the cells 202 generally includes a cavity 204 configured to retain a flying insect in the cavity 204. In the illustration, each cavity 204 is defined by a vertical sidewall of a partition 206 separating the first cell 202a and the second cell 202b, an outer vertical sidewall 208, opposite the sidewall of the partition, and a horizontal bottom surface 210. An opening 212 is disposed at the front (as arranged in the view of FIG. 2) of each cavity 204, and a frame 214 surrounds at least a portion of the opening 212. In the illustration, the frame 214 comprises a flange or similar protrusion extending from the partition 206, the sidewall 208, and the bottom 210 of the cavity 204.

A vertical rear wall 216 forms a back of the cavity 204. The rear wall 216 is illustrated as comprising a mesh or other porous material. In some embodiments of the disclosure, the back wall 216 is gas permeable to allow a gaseous attractant on a side of the rear wall 216 opposite the cavity 204 to enter the cavity 204. Although the back wall 216 may be gas permeable, it preferably is impermeable to insects to be trapped in the cavity 204. For example, in one embodiment, the back wall 216 is made of a conventional insect netting, such as mosquito netting. As also illustrated in FIG. 2, supports 218 may be provided proximate the back of the cavity. The supports 218 may provide rigidity to the module 200, and also may provide a surface to which the material comprising the back wall 216 is affixed. In other implementations, the supports 218 may not be necessary.

Although the back wall 216 is illustrated as being gas permeable, in other implementations the back wall 216 may be formed from a solid, gas impermeable material. In such implementations, a plurality of holes may be formed through the back wall 216. In other embodiments, other portions of the module 200 (other than or in addition to the back wall 216 may be gas permeable to allow flow of a gaseous attractant into the cavity 204. For example, portions of the partition 206, the sidewalls 208, and/or the bottom 210 may be gas permeable in addition to, or instead of the back wall 216. In still other embodiments, an attractant may be disposed in the cavity 204. For example, an attractant could be placed in each cavity or incorporated into one or more features forming the cavity 204. By way of non-limiting example, polymers that emit odorants or other volatiles are known and may be used to form the back wall 216, for example. In still further examples, an attractant may be placed proximate the module 200 such that the attractant enters the cavity through the opening 212. In these examples, permeability of the structures forming the cavity may be of less (or no) importance.

In some embodiments, the module 200 may be formed of any rigid material, including but not limited to metal, a rigid polymer, such as acrylonitrile butadiene styrene (ABS) or polycarbonates, or some combination thereof. For example, the module 200 may be molded from an ABS/polycarbonate blend. Depending upon an intended use of the insect trap, a person having ordinary skill in the art will identify preferred materials selections for forming the module 200. For example, when the device is intended to be transported using a drone or other vehicle, it may be necessary to limit the weight of the module as much as possible. Reducing the weight may require lighter materials, and may also determine a number of modules to be used in the completed trap.

As noted above, and as described in more detail below, the module 200 may be configured for attachment or assembly with one or more additional modules. In the illustrated module 200, alignment features 220 are provided to promote such assembly. More specifically, side alignment features 220a are generally provided along edges of the module 200 and a front alignment feature 220 be is provided proximate a front of the module 200. The alignment features 220 are generally configured as protrusions extending from a top of the module 200. Although not illustrated, the module 200 is provided with cooperating indentations or cavities, and a bottom surface. In this manner, when a second module, identical to the illustrated module 200 is placed on top of the module 200, the indentations in the bottom of the second module receive the alignment features 220, thereby nesting the modules on top of each other. For example, FIG. 3, described in more detail below, illustrates a plurality of modules 200 nested in this manner.

The alignment features 220a, 220b are examples of features for aligning modules relative to each other. This disclosure is not limited to the illustrated features 220. In other implementations, similar features may be provided in different locations on the module 200, the alignment features may take different shapes, and/or the alignment features may allow for fixing the modules relative to each other. By way of non-limiting example, the alignment features may include through holes on each of the modules that align concentrically when the modules are correctly assembled. A bolt, screw, or other faster may then be placed in the through hole to secure the modules relative to each other. In other implementations, the alignment features may not be necessary. For instance, the modules may be placed in a housing or similar holder configured to retain the modules 200 relative to each other. In such implementations, the alignment features 220 may instead promote alignment of the module 200 with the housing.

As will be appreciated, when a second module is placed on top of the module 200, a bottom of the second module will form a top of the cavity 204. In this manner, the cavity 204 is bounded on the top, bottom, back, and lateral sides. Access to the cavity 204 is provided only through the opening 212. In alternate implementations, for example, for a top module 200 in a stack of modules, a separate top (not illustrated) may be provided above the cavity 204, e.g., to completely surround the cavity 204 of the top module 200.

In embodiments of this disclosure, a door 222 may be provided to selectively close the opening 212 of each of the cells 202. More specifically, each door 222 is movable between a closed position enclosing the cavity 204 and an open position in which the cavity is accessible through the opening 212. In FIG. 2, a door 222 is illustrated arranged in the closed position in the first cell 202*a* and in the open position in the second cell 202*b*. In the illustrated embodiment, in the closed position, an outer periphery of the door 222 contacts the frame 214, and in the open position, the door 222 pivots approximately 90° relative to the closed position. To promote this pivoting, the door 222 includes a door mount 224 and a cooperating door mount 226 is disposed on a base surface 228. The base surface 228 is a generally planar surface that extends forward from the frame 214. A generally horizontal aperture is provided through the door mount 226 disposed on the base surface 228 and the door mount 224 on the door 222 includes a similar aperture. When the door mounts 224, 226 are aligned, a pin (not shown) may be retained in the aligned apertures, thereby creating a pivot about which the door hinges.

In the illustrated embodiment, the door 222 is biased to the closed position. For instance, a biasing member, illustrated as a spring 230 may be disposed on the pin disposed in the door mounts 224, 226. The illustrated spring 230 is a helical spring that applies a force against each of an outer surface of the door 222 and the base surface 228. In other implementations, biasing members other than the spring 230 may be used. Moreover, the door may be other than hinged relative to the base surface 228. By way of non-limiting example, the door 222 may be hinged relative to a top surface, i.e., above the door when a top is provided for the cell, or relative to sides of the cell. In still other implementations, the door 222 may not pivot at all. For instance, the door could slide relative to the opening. Other ways of covering the opening 212 will be appreciated by those having ordinary skill in the art with the benefit of this disclosure.

A latch 232 is provided to retain the door 222 in the open position. The latch 232 may be any member that cooperates with the door 222 to selectively retain the door in the open position against the biasing force of the spring 230. As illustrated in the example, the latch 232 includes an undercut that cooperates with a similar feature on the door. The latch is movable between a retaining position, i.e., contacting the door to hold the door in the open position, and a release position spaced from the retaining position. In the illustrated embodiment, a biasing latch spring 234 is provided to retain the latch 232 in the retaining position. The biasing spring 234 of FIG. 2 is a torsion spring retained in position by one or more latch spring mounts 236. A distal end of the spring contacts a portion of the latch 232 to hold the latch 232 in the retaining position. In FIG. 2, the latch 232 is in the retaining position when it is biased towards a front of the module 200.

The latch 232 is not limited to the configuration illustrated in FIG. 2. The latch can generally include any mechanism or means that holds the door in the open position. For instance, a permanent magnet may be disposed on the base 228 or the door 222 and may attract another magnet or ferromagnetic feature disposed on the other of the base 228 and the door 222. In this example, the magnetic attraction provides the biasing force to retain the door in the open position.

In the embodiment illustrated in FIG. 2, a latch actuator 238 is provided to move the latch 232 from the retaining position to the release position. Although the latch actuator 238 may be any number of actuators, including but not limited to, servomotors, pneumatic actuators, and the like, latch actuator 238 is illustrated as a wire 240 formed of a shape memory alloy. The memory alloy wire 240 is configured to contact the latch 232 and opposite ends of the wire 240 are connected to a circuit board 242. Memory wire posts 244 also are illustrated in FIG. 2. In some examples, the wire posts 244 may be provided to shape the direction of the wire 240. In other examples, the wire 240 may be wound one or more times about the posts 244, for example, to increase an overall length of the wire.

In operation, the circuit board 242 controls a current applied to the memory alloy wire 240. With application of a threshold current, the wire heats and deforms, e.g., by contracting. As the wire 240 contracts, the wire 240 acts on the latch 232 to draw the latch 232 relatively closer to the opening 212 of the cell 202 This actuation of the latch 232 causes the latch to move from the retaining position to the release position. When the latch 232 no longer contacts the door 222, the door closes under the bias of the spring 230.

Actuators other than the memory alloy wire 240 may be used to move the latch 232 from the retaining position to the release position. By way of non-limiting example, the latch may be moved by an electric motor, a pneumatic actuator, an electromagnetic actuator, or another known mechanism. In some examples, the latch may be attached to or otherwise acted on by a piston of such an actuator.

In still other embodiments, the latch 232 and actuator 240 for moving the latch may not be used at all. In one alternate example, and actuator may be provided that acts directly on the door 222 to selectively actuate the door 222 between the open position and the closed position. In such an example embodiment, the biasing member 230 may also be unnecessary, as the actuator could retain the door in either the open position or the closed position. For example, servomotors or the like may be disposed to pivot the door 222 in much the same manner as illustrated in the Figures.

As also illustrated in FIG. 2, a number of additional mounting features may be provided to promote attachment, retention, and/or alignment of various components of the module 200. For instance, a plurality of circuit board mounting features 246 are illustrated. An example embodiment, the circuit for mounting features 246 are series of protrusion spaced relative to each other to define a receptacle for receiving the circuit board 242. In other embodiments, the circuit board mounting features 246 may include a latch or other feature to actively restrain the circuit board 242 in position, e.g., by selectively extending over or contacting a top of the circuit board 242. FIG. 2 also illustrates a plurality of latch mounting features 248. The latch mounting features 248 include an undercut positioned such that a portion of the latch 232 may be retained under the undercuts. In this manner, the latch mounting features 248 retain the latch 232 in the proper position and orientation, e.g., even when the memory alloy wire 240 actuates the latch 232.

As generally illustrated in FIG. 2, the door 222, the latch 232 and its associated components, and the actuator 238 and its associated components are disposed on the base surface 228 outside of the cavity 204. Sidewalls 250, 252 are generally disposed opposite, lateral sides of those components, extending upward from the base surface 228. More specifically, the sidewall 250 is generally disposed at the outsides of the module 200 and the surfaces 252 are associated with the partition 206. In some embodiments, the sidewall 250 and the opposite surface 252 are parallel to each other.

A cutout 254 may also be provided proximate a front (as illustrated in FIG. 2) of the outer sidewall 250. Sensing components may be provided in the cutout 254. For instance, FIG. 2 shows a reflective surface 256, an emitter 258 and a receiver 260 generally arranged in the cutout 254. Although not in view in FIG. 2, a second reflective surface, e.g., a mirror, may also be disposed on the surface 252. As best shown in connection with the cell 202b, the emitter 258 emits one or more light rays, such as infrared light rays. For instance, the emitter may be an infrared light emitting diode (LED). In this embodiment, at least some of the emitted rays approach a mirror or other reflective surface provided on the surface 252 opposite the sidewall 250 at an angle, and are reflected back toward the cutout 254. There, at least some of the rays reflect off the reflective surface 256 disposed in the cutout 254. In this manner, at least some of the emitted rays continue to reflect back and forth between the surface 252 and the reflective surface 254 until eventually, they arrive at the receiver 260. As will be appreciated, the rays emitted by the emitter 258 span across substantially all of the area between the opposing surfaces 250, 252. In these embodiments, the reflective surface 254 may be a mirror, or it may a reflective surface resulting from a surface finishing or plating process, e.g., an electroless nickel immersion gold surface plating.

In operation, when a flying insect approaches the module 200 in a direction approaching the cavity 204, it will disrupt the light beam received at the receiver 260. This disruption of the light beam may signal the circuit board 242 to actuate the latch 232 to close the door. In this manner, the door 222 moves from the open position to the closed position, trapping the insect that disrupted the light beam received at the receiver 260. In the embodiment just described, any object that disrupts the light beam received at the receiver 260 may trigger closing of the door 222. In other embodiments, it may be possible to determine the source of the disruption of the light beam, and only close the door 222 when a predetermined disruption occurs. By way of non-limiting example, the sensing apparatus may be able to determine a size of the object that disrupts the light beam, and the door 222 may not be closed when the size of the disturbance exceeds a predetermined threshold. In this manner, larger flying insects such as moths or beetles may not trigger closing the door 222 whereas smaller insects, like mosquitoes, will cause the door 222 to close. Other features of the disruption may also be used to discriminately close the door 222. For example, other features such as a wing flutter pattern or a heat signature of an object sensed by the sensing apparatus may be used.

Additional or alternative sensing apparatus may be used in conjunction with or instead of the emitter 258 and receiver 260 illustrated in FIG. 2. For example, but without limitation, the module 200 may make use of one or more of motion sensors, contact sensors, acoustic sensors, temperature sensors, and optical sensors. For example, the sensing apparatus may include a camera or other image capture device, and a captured image of a flying insect may be analyzed to determine whether to close the door 222. For instance, a researcher may also be able to review captured images of trapped insects and determine whether certain cells should be opened to release the contents and/or trap one or more additional insects. Moreover, a researcher may be able to determine whether a captured mosquito has blood in its stomach, and if it does not, the trap holding that mosquito may be opened, i.e., to release the currently trapped mosquito and await another. In other embodiments, a researcher may be unnecessary to make such a determination. For example, a processor associated with an optical sensor may be able to analyze the captured image and make the determination.

FIG. 2 also illustrates a pair of cutouts 262 located at opposite sides of the module 200. The cutouts 262 may be configured to receive electronic components (not shown) used to control the elements of the respective cells 202. In some embodiments, the emitter 258, receiver 260, and/or mirror 254 may be disposed on a component, such as a circuit board or the like, retained in the cutout 262. For example, the cutout 262 may align the circuit board such that the mirror 256, emitter 258, and receiver 260 are properly positioned relative to the cutout 254 in the sidewall 250.

Figure 3:
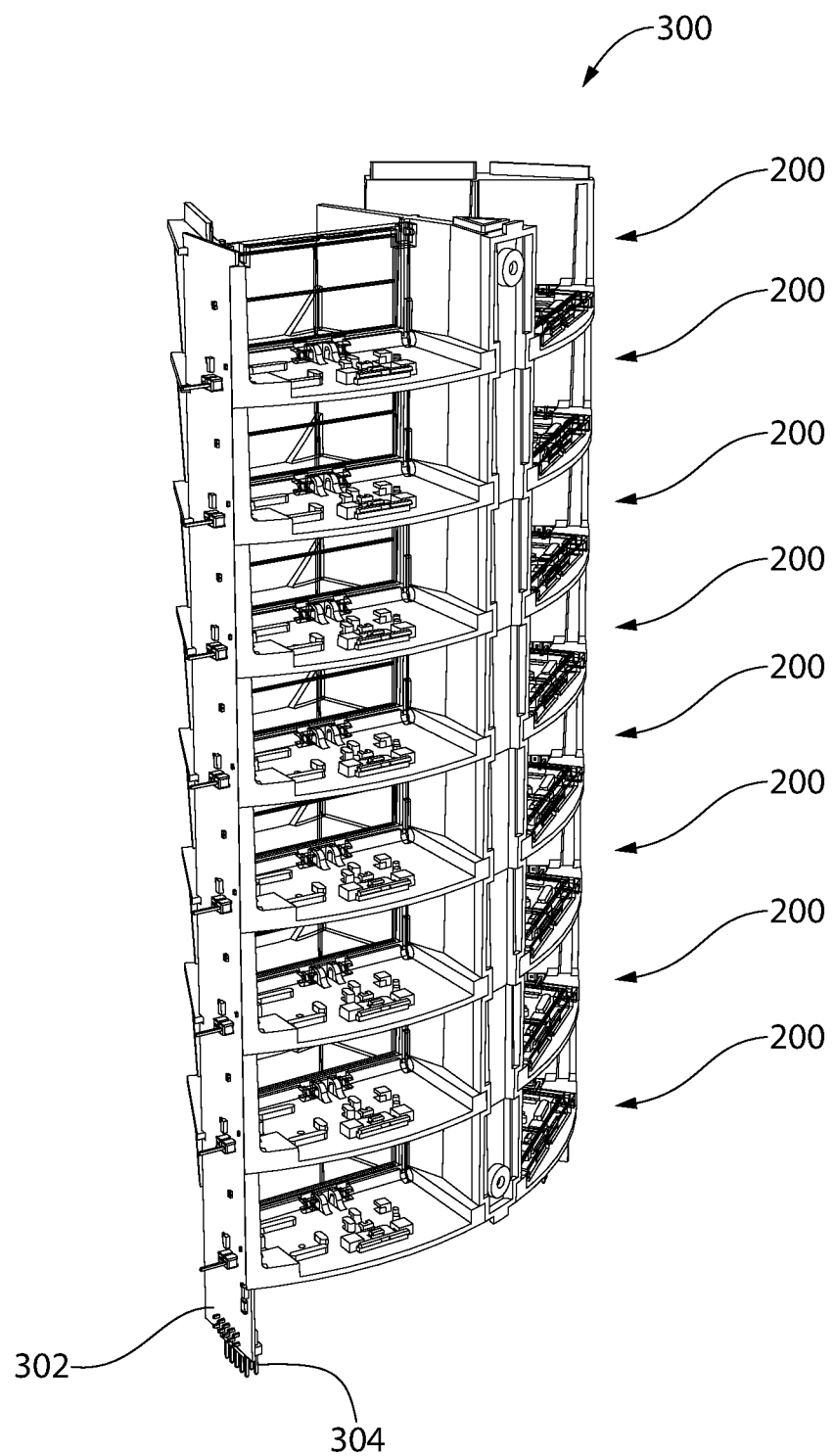
FIG. 3 is a perspective view of a plurality of the example modules illustrated in FIG. 2, arranged in a column.

FIG. 3 illustrates a column 300 made up of a plurality of the modules 200 illustrated in FIG. 2. In FIG. 3, eight modules 200 are stacked on top of each other to form the column 300. Accordingly, sixteen discrete cells are provided in the column. In other embodiments, more or fewer modules 200 may be included in the column 300.

As noted above with regard to FIG. 2, each the modules may be stacked on each other using alignment features, such as alignment features 220, to properly orient and nest the modules 200, to form the column 300. As illustrated, when the modules are stacked, a bottom surface of each module 200 provides a top for the module disposed below. Although not illustrated, a top, such as the cap 118, may be disposed on the top module 200.

As also illustrated in FIG. 3, a circuit board 302 may also be provided in conjunction with the column 300. The circuit board 302 generally provides electronic functionality to each of the cells. For instance, the emitters, receivers, and/or mirrors may be formed on the circuit board 302. For example, the emitters, receivers, and/or mirrors may be plated on a surface of the circuit board 302, e.g., using electroless nickel immersion gold surface plating. The circuit board 302 may also provide an electrical connection to the latch actuator. In addition, the circuit board 302 may provide power, information and/or other functionalities to the individual cells 202. For instance, a power source, memory, and/or other electronic devices may be provided at a location spaced from the cells, e.g., in the base 104 of the trap 100 and the circuit board 302 provide an electrical connection to such components in the base 104.

To promote attachment of the circuit board 302 to such components, an electrical connector 304 may be provided at a distal end of the circuit board 302. For example, the electrical connector 304 may be a conventional pin connector that includes a plurality of pins for insertion into a receptacle (not shown) to provide the electrical connection.

In the embodiment illustrated in FIG. 3, the circuit board 302 may be a single board that connects to multiple modules 200. In the illustrated example, the cutouts 262 of the stacked modules 200 align and the circuit board 302 is disposed in the cutouts 262. The circuit board is sized to extend along the entire height of the column 300, and includes electrical connections for one of the cells in each of the modules 200. In other embodiments, the circuit board 302 may instead include a plurality of circuit boards. For example, a circuit board 302 may be provided for each cell in each of the modules 200. In such examples, the circuit boards may connect to each other when the modules are aligned, or each circuit board may be connected to electronic components disposed elsewhere in the trap, e.g., in the base. It may be easier to increase and/or decrease the height of the column 300, for example. In other embodiments, a single circuit board 302 may connect to more than one cell, but to fewer than all in the column. For example, a single circuit board 302 may control both cells in a module 200. A person having ordinary skill in the art will understand that the disclosure is not limited to any one configuration. Multiple circuit boards may be associated with a single cell, e.g., one for controlling the latch and another associated with the sensing apparatus, or a single circuit board can control a plurality of the cells.

The column 300 may be configured to be placed together with like columns 300 to form the insect trap. For instance, four columns 300 may be configured about an axis to form the complete insect trap 100 illustrated in FIG. 1. In other implementations, more or fewer columns or stacks may be provided. Moreover, this disclosure is not limited to columnar arrays disposed about a central axis.

Figure 4:
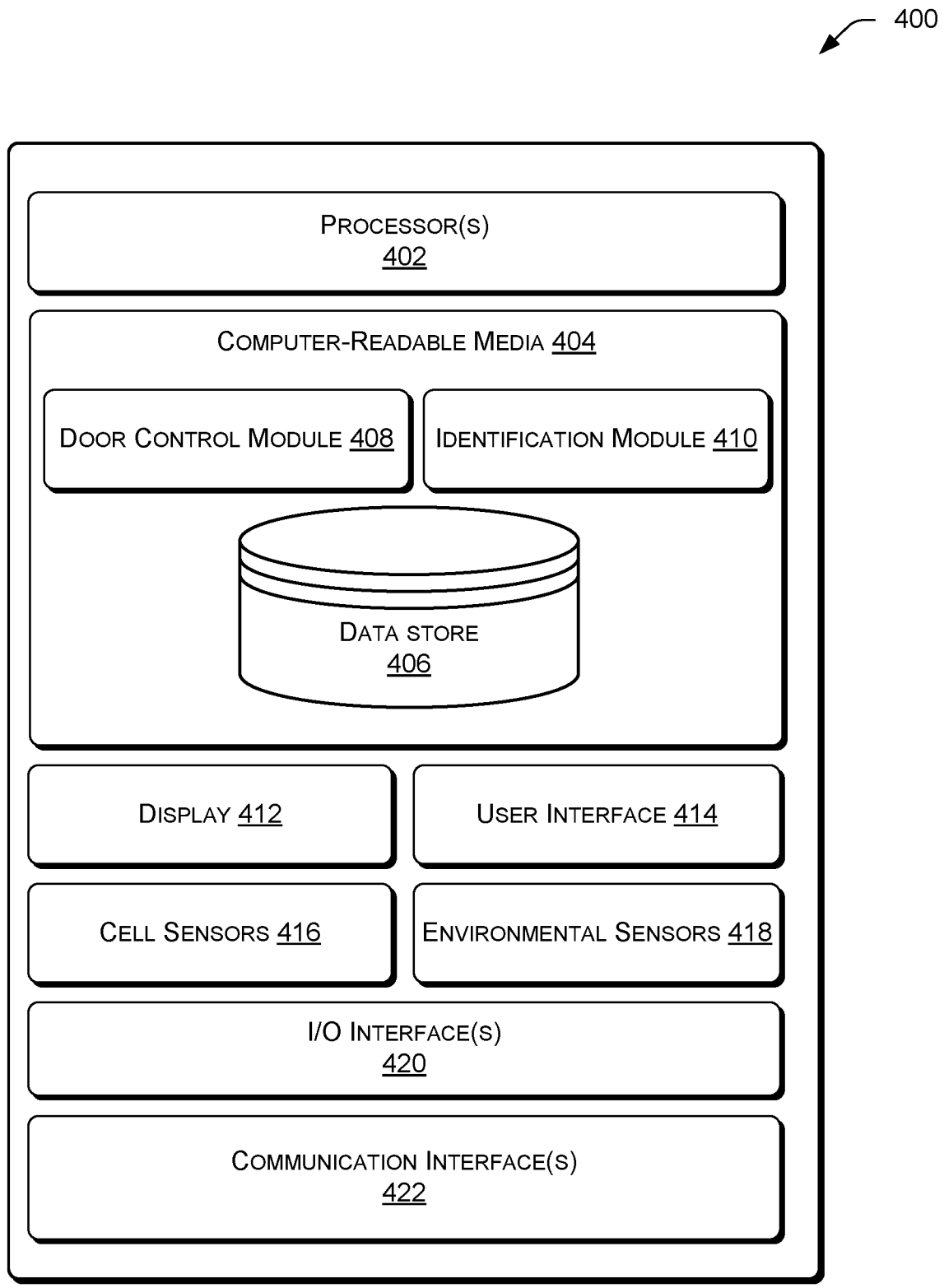
FIG. 4 is a schematic illustration of electronic and computing components that may be used in an insect trap according to embodiments of this disclosure.

FIG. 4 is a schematic illustration of electronic and computing components of an insect trap 400, which may be the insect trap 100 illustrated in FIG. 1. In a basic configuration, the insect trap 400 includes, or accesses, components such as at least one processor 402, one or more computer-readable media 404, one or more communication interfaces 422, and one or more input/output (I/O) components 420. Each processor 402 may itself comprise one or more processors or processing cores. For example, the processor 402 can be implemented as one or more microprocessors, microcomputers, microcontrollers, digital signal processors, central processing units, state machines, logic circuitries, and/or any devices that manipulate signals based on operational instructions. In some cases, the processor 402 may be one or more hardware processors and/or logic circuits of any suitable type specifically programmed or configured to execute the algorithms and processes described herein. The processor 402 can be configured to fetch and execute computer-readable processor-executable instructions stored in the computer-readable media 404.

Depending on the configuration of the portable computing device 400, the computer-readable media 404 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 404 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the insect trap 400 may access external storage, such as RAID storage systems, storage arrays, network attached storage, storage area networks, cloud storage, or any other medium that can be used to store information and that can be accessed by the processor 402 directly or through another computing device or network. Accordingly, the computer-readable media 404 may be computer storage media able to store instructions, modules or components that may be executed by the processor 402. In some implementations, the computer storage media 404 may also store information about the trap and/or cells of the insect trap. For instance, the media 404 may store an open/closed indication for each cell, e.g., so a researcher can determine whether the trap should be retrieved. The media 404 may also store information about conditions associated with the trap and/or cells. In some implementations, a date, time, and environmental data corresponding to capture of an insect may be stored in the computer readable media 404.

The computer-readable media 404 may also be used to store and maintain any number of functional components that are executable by the processor 402. In some implementations, these functional components comprise instructions or programs that are executable by the processor 402 and that, when executed, implement operational logic for performing the actions and services attributed above to the insect trap 400. Functional components of the insect trap 400 stored in the computer-readable media 404 may include a door control module 408 and an identification module 410.

The door control module 408 may be executed by the processor(s) 402 to selectively move the door between the open position and the closed positions. The identification module 410 may be executed by the processor(s) 402 to determine a type of disturbance sensed by the sensors arranged proximate the opening of the cell. The door control module 408 may cause the door to close when the identification module determines that a sensed disturbance has a signature (e.g., size, temperature, biometric data, movement patter, etc.) that matches that of an insect-to-be-trapped.

In addition, the computer-readable media 404 may also include a data store 406 that stores data, data structures and the like, that are used by the functional components. For example, data stored by the data store 406 in the computer-readable media 404 may include rules for interpreting sensor outputs, e.g., to trap only certain insects. Depending on the desired functionality and features of the insect trap 400, the computer-readable media 404 may also optionally include other functional components and data, such as other modules and data, which may include programs, drivers, etc., and the data used by the functional components. Further, the insect trap 400 may include many other logical, programmatic and physical components, of which those described are merely examples that are related to the discussion herein.

The insect trap 400 may further include the one or more communication interfaces 422, which may support both wired and wireless connection to various networks, such as cellular networks, radio, Wi-Fi networks, close-range wireless connections, Bluetooth/BLE, near-field connections, infrared signals, audio signals, local area networks, wide area networks, the Internet, and so forth, examples of which are additionally enumerated above. For instance, the communication interfaces may allow a researcher to remotely power up or power down components of the insect trap and/or determine whether the trap should be received, e.g., because the trap is full. The communication interfaces 422 may further allow a user to access storage on or through another device, such as a network attached storage device, cloud storage, or the like.

The insect trap 400 may further be equipped with the one or more various I/O components 420. Such I/O components 420 may include speakers, a microphone, and various user controls (e.g., buttons, a joystick, a keyboard, a keypad, a touch screen, etc.), a haptic output device, and so forth. For example, the insect trap 400 may include suitable drivers configured to accept input from a keypad, keyboard, or other user controls and devices included with the I/O components 420.

Other components included in the insect trap 400 may include a display 412, which may be the display 112, and a user interface 414, which may be the user interface 110. The insect trap may also include various types of sensors, including but not limited to cell sensors 416, which detect presence of a flying insect in the cells 202, and environmental sensors 418. For example, the cell sensors 416 may include the emitter 258 and the receiver 260 described above. In other embodiments, the cell sensors 416 may include pressure sensors, proximity sensors, optical sensors, and the like. The environmental sensors 418 may detect parameters of an environment around the insect trap 400. For example, the environmental sensors 418 may include an ambient temperature sensor, an ambient light sensor, a barometric pressure sensor, and so forth. Numerous other types of environmental sensors 418 may be included on the insect trap 400, with the foregoing being merely several examples for discussion purposes. Moreover, as discussed above, readings and outputs from the sensors 416, 418 may be stored in the insect trap 400 for later analysis.

Example Clauses

A: An insect trap may include one or more sidewalls defining a cavity configured to receive a flying insect in the cavity and an opening through which to receive the flying insect into the cavity; a door movable relative to the opening between an open position in which the door is spaced from the opening and a closed position in which the door obstructs the opening to prevent the flying insect from escaping the opening; a sensor proximate the opening to sense that the flying insect has entered the cavity through the opening; and an actuator actuatable to move the door from the open position to the closed position at least in part in response to the sensor sensing that the flying insect has entered the cavity through the opening.

B: An insect trap of paragraph A may further include a biasing member biasing the door to the closed position.

C: An insect trap according to either of paragraphs B or C further includes a latch movable between a retaining position that holds the door in the open position, against a force of the biasing member, and a releasing position in which the force of the biasing member moves the door to the closed position.

D: An insect trap according to any of paragraphs A through C, in which the actuator moves the latch from the retaining position to the releasing position to move the door from the open position to the closed position.

E: An insect trap according to any of paragraphs A through D, in which the actuator comprises a shape memory alloy and a current source for applying a current to the shape memory alloy.

F: An insect trap according to any of paragraphs A through E, wherein the shape memory alloy comprises a shape memory alloy wire in physical communication with the latch, the current applied by the current source results in a deformation of the shape memory alloy wire, and the deformation of the shape memory alloy wire moves the latch from the retaining position to the releasing position.

G: An insect trap according to any of paragraphs A through F further includes bait disposed to attract the flying insect to the cavity.

H: An insect trap according to any of paragraphs A through G, further includes a computing device disposed to receive signals from the sensor, the computing device including one or more processors; and memory accessible by the processor, the memory storing instructions that when executed by the processor, determine, based at least in part on the signals from the sensor, that the flying insect has entered the cavity.

I: An insect trap according to any of paragraphs A through H, the flying insect comprising a first flying insect and the memory storing additional instructions that when executed by the processor: determine, based at least in part on the signals from the sensor, that the first flying insect has entered the cavity or determining that a second flying insect has entered the cavity, the second flying insect being different from the first flying insect, and at least in part in response to determining that the first flying insect has entered the cavity, controlling the actuator to move the door from the open position to the closed position; and at least in part in response to determining that the second flying insect has entered the cavity, maintaining the door in the open position.

J: An insect trap according to another embodiment may include: a housing having a cell defining a cavity sized to receive a flying insect to be trapped in the cavity and an opening for the flying insect to enter the cavity; a door coupled to the housing adjacent to the opening of the cell, the door being movable relative to the opening between an open position in which the cell is open to receive the flying insect and a closed position in which the cell is closed to trap the flying insect in the cavity; a sensor proximate the cavity and configured to sense the presence of the flying insect to be trapped in the cavity; a biasing member biasing the door to the closed position; a latch movable between a retaining position contacting the door to retain the door in the open position and a release position spaced from the door; and an actuator in communication with the sensor and configured to move the latch from the retaining position to the release position at least in part in response to the sensor sensing the presence of the flying insect to be trapped in the cavity.

K: An insect trap according to paragraph J, wherein the actuator comprises a shape memory alloy that deforms in response to application of a current.

L: An insect trap according to either of paragraphs J or K, wherein the sensor comprises a presence sensor and the insect trap further comprising one or more environmental sensors for sensing conditions in an environment of the insect trap.

M: An insect trap according to any of paragraphs J through L further comprising: a computing device disposed to receive signals from the sensor, the computing device including one or more processors; and memory accessible by the processor, the memory storing instructions that when executed by the processor, determine, based at least in part on the signals from the sensor, that the flying insect has entered the cavity.

N: An insect trap according to any of paragraphs J through M, wherein at least a portion of the cell is vapor permeable to allow a gaseous attractant to enter the cavity from outside the cavity.

O: An insect trap may include a first housing having a first cell defining a first cavity sized to receive a first flying insect to be trapped in the first cavity and a first opening through which the first flying insect enters the first cavity; a first door disposed to selectively obstruct the first opening to prevent the first flying insect from escaping the first cavity; a first alignment feature disposed on the first housing; a second housing having a second cell defining a second cavity sized to receive a second flying insect to be trapped in the second cavity and a second opening through which the second flying insect enters the second cavity; a second door disposed to selectively obstruct the second opening to prevent the second flying insect from escaping the second cavity; and a second alignment feature disposed on the second housing, the second alignment feature configured to register with the first alignment feature to align the first housing with the second housing.

P: An insect trap according to paragraph O, in which the first alignment feature includes a protrusion protruding from the first housing and the second alignment featured comprising a receptacle disposed in the second housing, the receptacle being sized to receive the protrusion.

Q: An insect trap according to paragraph O or paragraph P, further comprising: a first sensor disposed on the first housing and configured to sense that the first flying insect has entered the first cavity; a second sensor disposed on the second housing and configured to sense that the second flying insect has entered the second cavity; and a computing device disposed to receive signals from the first sensor and the second sensor.

R: An insect trap according to any of paragraphs O through Q, further comprising a gaseous attractant emitter spaced from the first cavity and the second cavity.

S: An insect trap according to any of paragraphs O through R, in which at least a portion of the first housing being vapor permeable to allow a gaseous attractant emitted from the gaseous attractant emitter to enter the first cavity and at least a portion of the second housing being vapor permeable to allow the gaseous attractant emitted from the gaseous attractant emitter to enter the second cavity.

T: An insect trap according to any of paragraphs O through S, further comprising: a first actuator disposed to move the first door from an open position to a closed position trapping the first flying insect in the first cavity; and a second actuator disposed to move the second door from an open position to a closed position trapping the second flying insect in the second cavity.

This disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:
1. An insect trap comprising:
    a plurality of cells arranged as an array of cells stacked to form a plurality of columns, the plurality of columns disposed around a central axis of the insect trap, and each cell of the plurality of cells comprising:
        one or more sidewalls defining a cavity configured to receive a flying insect in the cavity and an opening through which to receive the flying insect into the cavity;
        a vapor permeable portion to allow a gaseous attractant provided within the central axis of the insect trap to enter the cavity of each of the plurality of cells;
        a door movable relative to the opening between an open position in which the door is spaced from the opening and a closed position in which the door obstructs the opening to prevent the flying insect from escaping via the opening;
        a sensor proximate the opening to sense that the flying insect has entered the cavity through the opening; and
        an actuator actuatable to move the door from the open position to the closed position at least in part in response to the sensor sensing that the flying insect has entered the cavity through the opening;
    a computing device disposed to receive signals from the sensor for each of the plurality of cells, the computing device including one or more processors; and
    memory accessible by the one or more processors, the memory storing instructions that when executed by the one or more processors:
    determine, based at least in part on the signals from the sensor, that the flying insect has entered the cavity of one of the plurality of cells,
    determine, based at least in part on the signals from the sensor, whether the flying insect that has entered the cavity of the one of the plurality of cells is a first flying insect or a second flying insect, the second flying insect being different from the first flying insect,
    at least in part in response to determining that the first flying insect has entered the cavity of the one of the plurality of cells, control the actuator to move the door of the one of the plurality of cells from the open position to the closed position to trap the first flying insect; and
    at least in part in response to determining that the second flying insect has entered the cavity of the one of the plurality of cells, maintain the door of the one of the plurality of cells in the open position so as not to trap the second flying insect.

2. The insect trap of claim 1, wherein each cell of the plurality of cells is individually controllable such that each cell of the plurality of cells can trap a flying insect independent of other cells of the plurality of cells.

3. The insect trap of claim 1, further comprising a biasing member biasing the door of each cell of the plurality of cells to the closed position.

4. The insect trap of claim 3, further comprising a latch movable between a retaining position that holds the door of each cell of the plurality of cells in the open position, against a force of the biasing member, and a releasing position in which the force of the biasing member moves the door of each cell of the plurality of cells to the closed position.

5. The insect trap of claim 4, in which the actuator moves the latch from the retaining position to the releasing position to move the door of each cell of the plurality of cells from the open position to the closed position.

6. The insect trap of claim 5, the actuator comprising a shape memory alloy and a current source for applying a current to the shape memory alloy.

7. The insect trap of claim 6, wherein the shape memory alloy comprises a shape memory alloy wire in physical communication with the latch, the current applied by the current source results in a deformation of the shape memory alloy wire, and the deformation of the shape memory alloy wire moves the latch from the retaining position to the releasing position.

8. The insect trap of claim 1, further comprising one or more environmental sensors for sensing conditions in an environment of the insect trap.

* * * * *